B. TATHAM.

Shot Manufacturing Machine.

No. 8,083. Reissued Feb. 12, 1878.

Witnesses
Otto Stifeland
Hugo Brueggemann

Inventor
Benjamin Tatham
by
Van Santvoord & Hauff
his attorneys

UNITED STATES PATENT OFFICE.

BENJAMIN TATHAM, OF NEW YORK, N. Y.

IMPROVEMENT IN SHOT-MANUFACTURING MACHINES.

Specification forming part of Letters Patent No. 198,057, dated December 11, 1877; Reissue No. 8,083, dated February 12, 1878; application filed January 23, 1878.

*To all whom it may concern:*

Be it known that I, BENJAMIN TATHAM, of the city, county, and State of New York, have invented a new and useful Improvement in Apparatus for Manufacture of Drop-Shot, which improvement is fully set forth in the following specification, reference being had to the accompanying drawings, in which—

Figure 1:
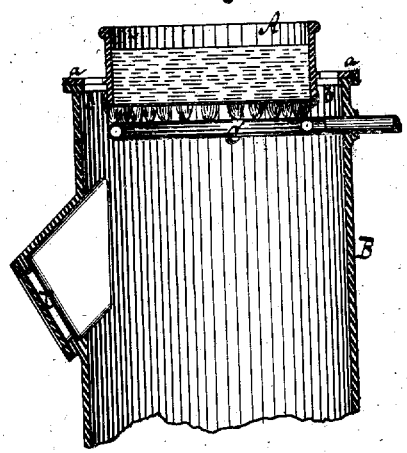
Figure 2:
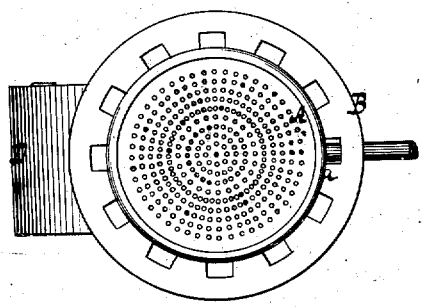
Figure 3:
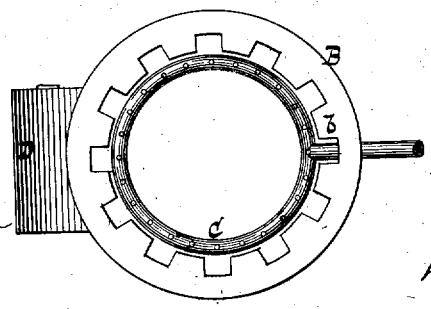

Figure 1 represents a vertical central section of my invention. Fig. 2 is a plan or top view. Fig. 3 is a similar view when the dropping-pan has been removed.

Similar letters indicate corresponding parts.

This invention consists in the combination of a shield or cylinder with the dropping-pan, said shield or cylinder being closed, in whole or in part, at the top and open to the atmosphere at the bottom, for retaining heat and keeping currents of cold air from the outside surfaces of the pan; also, in the combination, with the dropping-pan, of a gas-flame or other supply of artificial heat, for regulating and controlling the temperature of the metal; further, in the combination, with the dropping-pan, of a gas-flame or other supply of artificial heat, and of a shield or cylinder for retaining heat and keeping currents of cold air from the metal as the same discharges from the dropping-pan.

Drop-shot has heretofore been made by passing prepared metal through holes in the bottom of an iron cylinder, called a "dropping-pan," made large enough to contain a body of metal from three to four inches deep and with a diameter of about ten or twelve inches.

This dropping-pan is so arranged that the molten metal shall issue through its holes in the form of drops more or less rapidly, or be formed into drops immediately thereafter, which drops become solidified during their descent into a reservoir of water below.

In practice it has been found that the metal, while in and passing from the dropping-pan, loses so much of its heat by the currents of cold air which come in contact with the same that the flow is liable to be retarded or stopped and the metal to become solidified in irregular forms, and it is often necessary to return a large proportion of the metal to the melting-pot, to be replaced by a fresh supply of metal of the proper temperature.

The object of my invention is to regulate the temperature of the metal while within and in its passage from the dropping-pan to the degree necessary to insure spherical forms and to protect it from currents of cold air, which would abstract heat from it prematurely.

In the drawings, the letter A designates the dropping-pan, which rests upon the shield or cylinder B, and is held at a sufficient elevation above a reservoir of water. On the outside of the pan is formed a flange, *a*, which rests upon a rim or flange, *b*, projecting inwardly from the upper edge of the cylinder B. Both these flanges are provided with openings, so that by turning the pan the openings in the flange *b* of the cylinder can be opened or closed, to suit circumstances. Below the bottom of the dropping-pan is situated a gas-pipe, C, bent so as to form a circle, and provided with a sufficient number of openings or burners, so arranged that, when the gas issuing from the burners is ignited, the flame will play upon and below the entire bottom of the pan.

The cylinder B is provided with one or more transparent doors, D, to enable the workman to see and have access to the bottom of the pan. The length and diameter of the cylinder may vary as circumstances may require. I have found that a diameter a little larger than the pan and six feet long answers for ordinary sizes of shot.

It is obvious that the construction of my apparatus may be varied in form, and yet secure the object of my invention. For instance, the gas-pipe may be replaced by any other suitable means for producing sufficient artificial heat beneath the bottom of the pan without obstructing the passage of the molten metal from the dropping-pan to the reservoir of water below.

By means of the shield or cylinder B, the bottom and sides of the dropping-pan may be protected from currents of cold air, and by the gas-flame or other supply of artificial heat within the shield the temperature of the metal can be kept up or raised to the degree necessary to insure spherical forms after it leaves the perforated bottom of the pan, and before it passes through the air in the shield or cylinder to the colder stratum of air below and becomes solidified.

What I claim as new, and desire to secure by Letters Patent, is—

1. The combination, in an apparatus for manufacturing drop-shot, of a shield or cylinder with the dropping-pan, said shield or cylinder being closed, in whole or in part, at the top and open to the atmosphere at the bottom, for retaining heat and keeping currents of cold air from the outside surface of the pan, substantially as set forth.

2. The combination, in an apparatus for manufacturing drop-shot, of a dropping-pan with a gas-flame or other supply of artificial heat of the necessary temperature, applied to the bottom of the pan for regulating and controlling the temperature of the metal, substantially as described.

3. The combination, in an apparatus for manufacturing drop-shot, of a dropping-pan, a gas-flame or other supply of artificial heat of the necessary temperature within the interior of the shield under the bottom of the dropping-pan, and of a shield or cylinder for retaining heat and keeping the currents of cold air from the metal as it is discharged from the dropping-pan, substantially as set forth.

4. In the process of manufacturing drop-shot, the application of a gas-flame or other equivalent gaseous heat to shot-metal as it is forming and after it separates into drops, which heat shall be sufficient to insure spherical forms before the metal becomes solidified, and before it reaches the water or other non-elastic liquid below, substantially as herein described.

In testimony that I claim the foregoing I have hereunto set my hand and seal this 21st day of January, 1878.

BENJN. TATHAM. [L. S.]

Witnesses:
W. HAUFF,
E. F. KASTENHUBER.